US010525838B2

(12) United States Patent
Sato et al.

(10) Patent No.: US 10,525,838 B2
(45) Date of Patent: Jan. 7, 2020

(54) POWER CONVERSION SYSTEM (71) Applicants: CENTRAL JAPAN RAILWAY COMPANY, Nagoya-shi (JP); Toshiba Infrastructure Systems & Solutions Corporation, Kawasaki-shi (JP)

(72) Inventors: Kenji Sato, Nagoya (JP); Masayuki Ueno, Nagoya (JP); Takafumi Fukushima, Nagoya (JP); Shigekazu Okada, Nagoya (JP); Kotaro Oda, Nagoya (JP); Hiroaki Otani, Fuchu (JP); Yasuomi Maki, Fuchu (JP); Kenichi Kikkawa, Saitama (JP); Tsunehito Fujita, Fuchu (JP); Manato Mori, Kawasaki (JP)

(73) Assignees: CENTRAL JAPAN RAILWAY COMPANY, Nagoya-shi (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 166 days.

(21) Appl. No.: 15/623,818

(22) Filed: Jun. 15, 2017

(65) Prior Publication Data
US 2017/0361716 A1 Dec. 21, 2017

(30) Foreign Application Priority Data
Jun. 16, 2016 (JP) .................. 2016-120297

(51) Int. Cl.
*B60L 50/51* (2019.01)
*B60L 1/00* (2006.01)
(Continued)

(52) U.S. Cl.
CPC .............. *B60L 50/51* (2019.02); *B60L 1/00* (2013.01); *B60L 3/0092* (2013.01); *H02J 4/00* (2013.01);
(Continued)

(58) Field of Classification Search
CPC ........ B60L 50/51; B60L 1/00; B60L 2210/40; B60L 3/0092; B60L 9/24; B60L 2200/26;
(Continued)

(56) References Cited

U.S. PATENT DOCUMENTS

| 2012/0000739 A1* | 1/2012 | Nogi | ........................ B60L 5/00 191/50 |
| 2015/0343906 A1* | 12/2015 | Hatanaka | .................. B60L 9/16 307/9.1 |

(Continued)

FOREIGN PATENT DOCUMENTS

| JP | 6-98409 A | 4/1994 |
| JP | 2010-215014 A | 9/2010 |
| JP | 5161816 B2 | 12/2012 |

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A power conversion system includes a transformer, a power conversion device for travel, a power conversion device for auxiliary power sources, and an electrical storage device. The power conversion device for auxiliary power sources includes a first AC to DC conversion unit, a power conversion unit for AC loads, and a power conversion unit for DC loads. The power conversion unit for AC loads converts DC power into AC power and supplies it to an AC load. The power conversion unit for DC loads converts DC power produced through conversion by the first AC to DC conversion unit into DC power and supplies it to a DC load. The electrical storage device is connected to power lines connecting DC power output terminals of the first AC to DC conversion unit and DC power input terminals of both the power conversion units for AC and DC loads. When power supplied from a tertiary winding of the transformer to the
(Continued)

first AC to DC conversion unit is reduced, the electrical storage device discharges power corresponding to the power reduction.

6 Claims, 6 Drawing Sheets

(51) Int. Cl.
*B60L 3/00* (2019.01)
*H02J 4/00* (2006.01)
*H02M 7/219* (2006.01)
*H02P 27/06* (2006.01)

(52) U.S. Cl.
CPC ............ *H02M 7/219* (2013.01); *H02P 27/06* (2013.01); *B60L 2210/30* (2013.01); *B60L 2210/40* (2013.01)

(58) Field of Classification Search
CPC .... B60L 58/10; Y02T 10/7241; H02M 7/219; H02J 4/00; H02P 27/06
See application file for complete search history.

(56) References Cited

U.S. PATENT DOCUMENTS

2017/0361713 A1* 12/2017 Fukushima ............. B60L 50/51
2019/0036457 A1* 1/2019 Kawamura ............... B60L 1/00

\* cited by examiner

POWER CONVERSION SYSTEM

BACKGROUND OF THE INVENTION

Technical Field

Embodiments of the present invention relate to a power conversion system.

Related Art

Power is not supplied from overhead wires to electric vehicles when the electric vehicles pass through non-electric sections where no power is supplied to overhead wires. In this case, there is a possibility of power not being supplied to loads mounted in electric vehicles. Japanese Unexamined Patent Application, First Publication No. 2010-215014 discloses a power conversion device convert of the related art.

DETAILED DESCRIPTION OF THE INVENTION

Hereinafter, a power conversion system according to embodiments will be described with reference to the drawings.

(First Embodiment)

Figure 1:
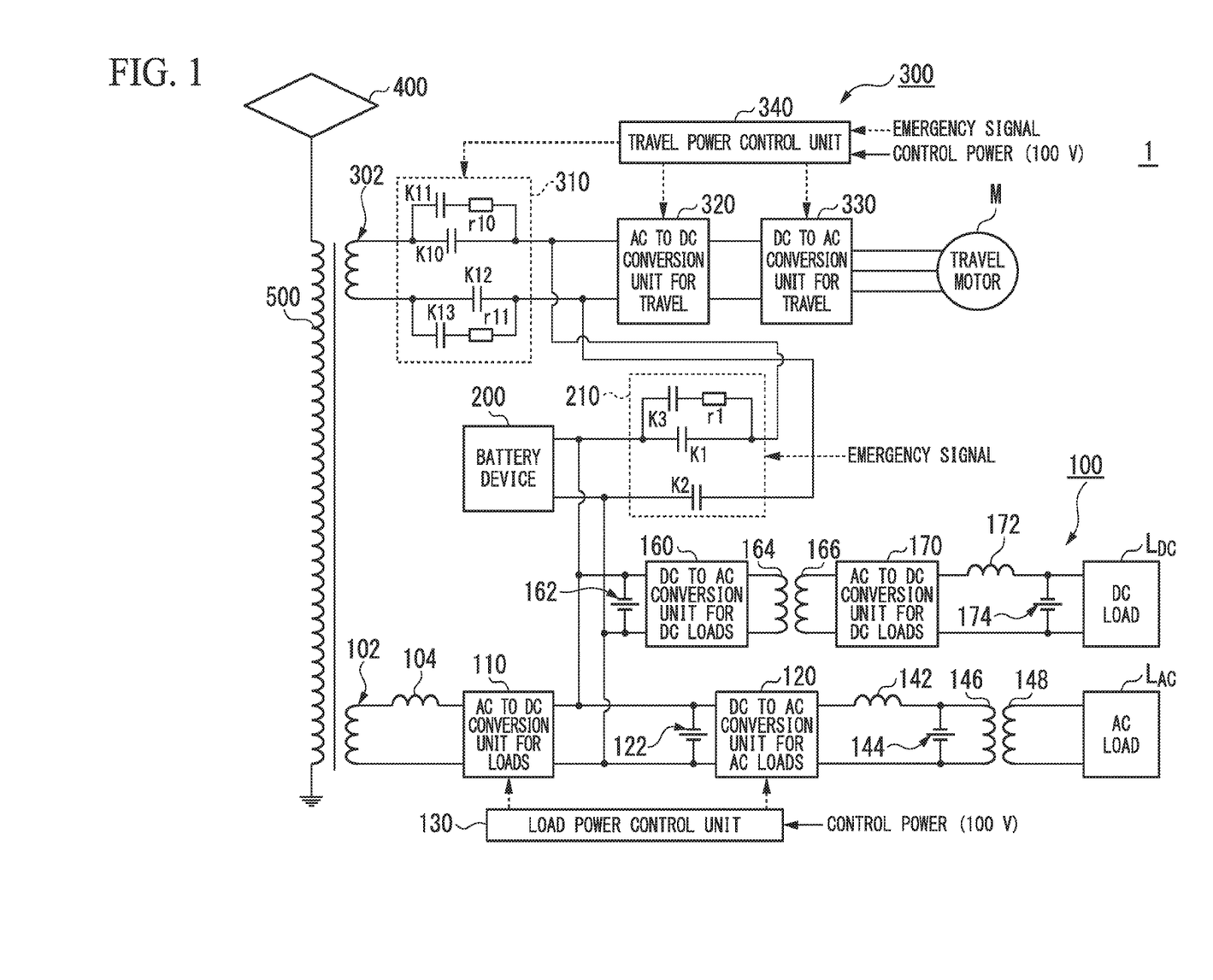
FIG. 1 is a diagram showing an example of a power conversion system 1 according to a first embodiment.

FIG. 1 is a diagram showing an example of a power conversion system 1 according to a first embodiment. The power conversion system 1 is mounted, for example, in a railway vehicle. The railway vehicle is an example of an electric vehicle. High-voltage alternating current (AC) power is supplied to the power conversion system 1 from overhead wires via a power collector 400 and windings for travel 500 and 302 of a main transformer. The power conversion system 1 converts the high-voltage AC power into AC power for travel and supplies the AC power for travel to a travel motor M. This allows the power conversion system 1 to cause the travel motor M to generate a travel torque, enabling travel of the railway vehicle. In the embodiment, the travel motor M is, for example, an induction motor.

Low-voltage AC power is also supplied to the power conversion system 1 from the overhead wires via the power collector 400 and windings for loads 500 and 102 of the main transformer. The voltage of the AC power supplied from the windings for loads 500 and 102 of the main transformer is lower than that of the AC power supplied from the windings for travel 500 and 302 of the main transformer. The power conversion system 1 converts the low-voltage AC power into AC power for loads and supplies the AC power for loads to an AC load $L_{AC}$. This allows the power conversion system 1 to drive the AC load $L_{AC}$. In the embodiment, the AC load $L_{AC}$ is a load of the railway vehicle other than the travel motor M, and is, for example, an electronic device or the like that operates with an AC voltage of 100 V. In addition, the power conversion system 1 converts the low-voltage AC power into direct current (DC) power for loads and supplies the DC power for loads to a DC load $L_{DC}$. This allows the power conversion system 1 to drive the DC load $L_{DC}$. In the embodiment, the DC load $L_{DC}$ is a load of the railway vehicle other than the travel motor M, and is, for example, an electronic device that operates with a DC voltage.

The power conversion system 1 includes, for example, a power conversion device for auxiliary power sources 100, a battery device 200, and a power conversion device for travel 300.

The power conversion device for auxiliary power sources 100 includes, for example, an AC to DC conversion unit for loads 110, a DC to AC conversion unit for AC loads 120, a load power control unit 130, a DC to AC conversion unit for DC loads 160, and an AC to DC conversion unit for DC loads 170.

Figure 2:
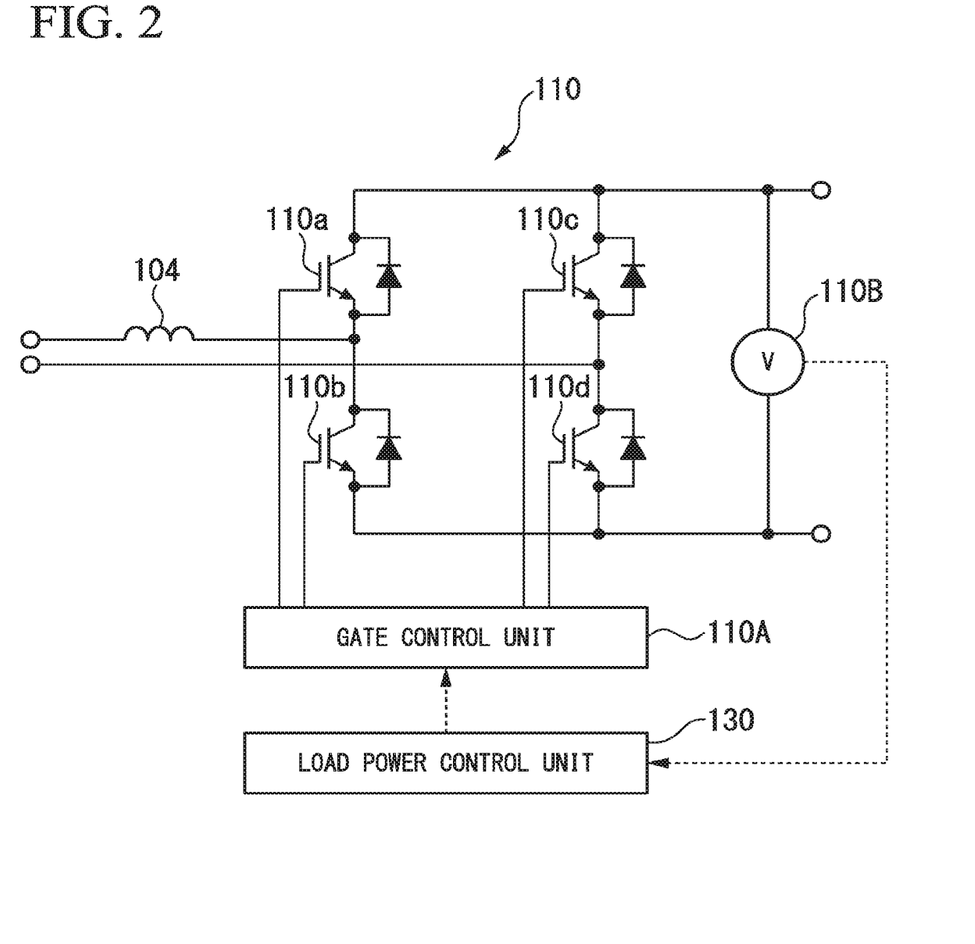
FIG. 2 is a diagram showing an example of an alternating current to direct current conversion unit for loads 110.

The AC to DC conversion unit for loads 110 converts the low-voltage AC power supplied from the power collector 400 via the windings for loads 500 and 102 of the main transformer into DC power. FIG. 2 is a diagram showing an example of the AC to DC conversion unit for loads 110. The AC to DC conversion unit for loads 110 includes, for example, switching elements 110a, 110b, 110c, and 110d, a gate control unit 110A, and a voltage sensor 110B. The switching elements 110a, 110b, 110c, and 110d are connected between a positive electrode line and a negative electrode line. The switching elements 110a, 110b, 110c and 110d are, for example, insulated gate bipolar transistors (IGBTs) incorporating diodes connected in antiparallel. The switching elements 110a, 110b, 110c, and 110d may also be other types of switching elements.

The gate control unit 110A provides gate signals to the gates of the switching elements 110a, 110b, 110c, and 110d on the basis of a command voltage supplied from the load power control unit 130. This allows the gate control unit 110A to switch the switching elements 110a, 110b, 110c, and 110d between a conductive state and a non-conductive state such that the output voltage approaches the command voltage. The AC to DC conversion unit for loads 110 is not limited to that of the example shown in FIG. 2 and may be any one of a step-up converter, a step-down converter, and a step-up/step-down converter.

The DC to AC conversion unit for AC loads 120 is a switching circuit including a plurality of switching elements bridge-connected between a positive electrode line and a negative electrode line to which power is supplied. The DC to AC conversion unit for AC loads 120 is also called an inverter. The switching elements are, for example, IGBTs. Other types of switching elements may also be used as the switching elements. Under the control of the load power control unit 130, the DC to AC conversion unit for AC loads 120 switches the switching elements between a conductive state and a non-conductive state to convert the DC power into AC power for loads.

A capacitor 122 is connected to the DC to AC conversion unit for AC loads 120 at its side of the AC to DC conversion unit for loads 110 in parallel with the AC to DC conversion unit for loads 110 and the DC to AC conversion unit for AC loads 120. The capacitance of the capacitor 122 is set to a level allowing the DC to AC conversion unit for AC loads 120 to supply stable power to the AC load $L_{AC}$. That is, the capacitance of the capacitor 122 need not be set so high that it can compensate for absence of the supply of AC power for loads to the AC load $L_{AC}$ when the railway vehicle travels in non-electric sections where the power collector 400 stops supplying AC power. The non-electric sections are provided, for example, at intervals of a predetermined distance in sections where the railway vehicle travels.

The AC power for loads produced through conversion by the DC to AC conversion unit for AC loads 120 is supplied to the AC load $L_{AC}$ via a coil 142, a capacitor 144, and a transformer 146 and 148.

The load power control unit 130 is realized by a processor such as a central processing unit (CPU) executing a program stored in a program memory. In addition, some or all of these functional units may be realized by hardware such as large scale integration (LSI), an application specific integrated circuit (ASIC), a field-programmable gate array (FPGA), or the like. The load power control unit 130 operates, for example, by being supplied with the operating power of 100 V produced through conversion by the power conversion device for auxiliary power sources 100.

The load power control unit 130 controls the AC to DC conversion unit for loads 110, the DC to AC conversion unit for AC loads 120, the DC to AC conversion unit for DC loads 160, and the AC to DC conversion unit for DC loads 170.

Similar to the DC to AC conversion unit for AC loads 120 described above, the DC to AC conversion unit for DC loads 160 is a switching circuit including a plurality of switching elements bridge-connected between a positive electrode line and a negative electrode line to which power is supplied. The DC to AC conversion unit for DC loads 160 converts DC power into AC power by switching the switching elements between a conductive state and a non-conductive state.

A capacitor 162 is connected to the DC to AC conversion unit for DC loads 160 at its side of the AC to DC conversion unit for loads 110 in parallel with the AC to DC conversion unit for loads 110 and the DC to AC conversion unit for DC loads 160. The capacitance of the capacitor 162 is set to a level allowing the DC to AC conversion unit for DC loads 160 to supply stable power to the AC to DC conversion unit for DC loads 170 downstream thereof. The capacitance of the capacitor 162 may be the same as or different from that of the capacitor 122.

The AC power produced through conversion by the DC to AC conversion unit for DC loads 160 is supplied to the AC to DC conversion unit for DC loads 170 via the transformer 164 and 166. The transformer 164 and 166, for example, steps down the voltage of the AC power produced through conversion by the DC to AC conversion unit for DC loads 160 to about 100 V.

The AC to DC conversion unit for DC loads 170 converts the AC power supplied from the DC to AC conversion unit for DC loads 160 via the transformer 164 and 166 into DC power. For example, the AC to DC conversion unit for DC loads 170 converts the AC power into DC power. Similar to the AC to DC conversion unit for loads 110, the AC to DC conversion unit for DC loads 170 may be configured as shown in FIG. 2 described above.

The DC power produced through conversion by the AC to DC conversion unit for DC loads 170 is supplied to the DC load $L_{DC}$ via a coil 172 and a capacitor 174.

The battery device 200 is connected to power lines which connect DC power output terminals of the AC to DC conversion unit for loads 110 and DC power input terminals of both the DC to AC conversion unit for AC loads 120 and the DC to AC conversion unit for DC loads 160. The battery device 200 is, for example, a battery having a low insulated separation voltage. The battery device 200 is, for example, a storage battery unit in which storage battery cells such as lithium ion batteries are connected in series or in parallel.

When the DC power supplied from the AC to DC conversion unit for loads 110 to the DC to AC conversion unit for AC loads 120 and the DC to AC conversion unit for DC loads 160 is reduced, the battery device 200 discharges power corresponding to the reduction of the DC power. This allows the battery device 200 to supply the discharge power to the DC to AC conversion unit for AC loads 120 and the DC to AC conversion unit for DC loads 160 when the railway vehicle travels in non-electric sections The power conversion device for travel 300 includes, for example, a charging circuit for travel 310, an AC to DC conversion unit for travel 320, a DC to AC conversion unit for travel 330, and a travel power control unit 340.

The charging circuit for travel 310 includes, for example, a contactor K10 connected to a positive electrode line, a contactor K11 and a resistor r10 connected in parallel to the contactor K10, a contactor K12 connected to a negative electrode line, and a contactor K13 and a resistor r11 connected in parallel to the contactor K12. The charging circuit for travel 310 also includes a coil (not shown) or the like for electromagnetically operating the contactors K10, K11, K12, and K13. The charging circuit for travel 310 switches the contactors K10, K11, K12, and K13 between a non-conductive state and a conductive state under the control of the travel power control unit 340. Upon start of the supply of high-voltage AC power, the charging circuit for travel 310 first switches the contactors K11 and K13 to a conductive state. Thereafter, the charging circuit for travel 310 switches the contactors K10 and K12 to a conductive state and switches the contactors K11 and K13 from the conductive state to a non-conductive state.

The AC to DC conversion unit for travel 320 is a switching circuit including a plurality of switching elements connected between a positive electrode line and a negative electrode line to which high-voltage AC power is supplied. The AC to DC conversion unit for travel 320 is also called a converter. The AC to DC conversion unit for travel 320 may be any one of a step-up converter, a step-down converter, and a step-up/step-down converter. The switching elements are IGBTs, but the present invention is not limited to this and other types of switching elements may be used. Under the control of the travel power control unit 340, the AC to DC conversion unit for travel 320 switches the switching elements between a conductive state and a non-conductive state to convert the high-voltage AC power supplied through the windings for travel of the main transformer into DC power.

The DC to AC conversion unit for travel 330 is a switching circuit including a plurality of switching elements bridge-connected between a positive electrode line and a negative electrode line to which power is supplied. The DC to AC conversion unit for travel 330 is also called an inverter. The DC to AC conversion unit for travel 330 includes three pairs of switching elements on the upper and lower bridge sides corresponding to three phases of the travel motor M. The switching elements are IGBTs, but the present invention is not limited to this and other types of switching elements may be used. Under the control of the travel power control unit 340, the DC to AC conversion unit for travel 330 switches the switching elements of each phase of the travel motor M between a conductive state and a non-conductive state to convert the DC power into AC power for travel.

The travel power control unit 340 is realized by a processor such as a CPU executing a program stored in a program memory. In addition, some or all of these functional units may be realized by hardware such as LSI, an ASIC, or an FPGA.

The travel power control unit 340 operates, for example, by being supplied with the operating power of 100 V produced through conversion by the power conversion device for auxiliary power sources 100. The travel power control unit 340 controls the charging circuit for travel 310, the AC to DC conversion unit for travel 320, and the DC to AC conversion unit for travel 330.

A battery device 200 is connected via a charging circuit 210 to power lines which connect high-voltage DC power output terminals of the charging circuit for travel 310 and high-voltage DC power input terminals of the AC to DC conversion unit for travel 320. For example, the voltage of the discharge power of the battery device 200 may be lower than the DC voltage generated by the AC power supplied to the AC to DC conversion unit for travel 320 and greater than the voltage of the DC power supplied to the DC to AC conversion unit for AC loads 120, but the present invention is not limited to this.

The charging circuit 210 includes, for example, a contactor K1 connected to a positive electrode line, a contactor K3 and a resistor r1 connected in parallel to the contactor K1, and a contactor K2 connected to a negative electrode line. The charging circuit 210 also includes a coil (not shown) or the like for electromagnetically operating the contactors K1, K2, and K3. The charging circuit 210 switches each contactor for DC power between a non-conductive state and a conductive state. Upon start of the supply of the discharge power from the battery device 200, the charging circuit 210 first switches the contactors K2 and K3 to a conductive state. Thereafter, the charging circuit 210 switches the contactor K1 to a conductive state and switches the contactor K3 from the conductive state to a non-conductive state.

The charging circuit 210 switches the state of each contactor on the basis of a manipulation by a manager such as a driver of the railway vehicle. An emergency signal is provided to the charging circuit 210, for example, upon manipulation of a predetermined manipulation portion (not shown) on a master controller (not shown) which is manipulated by the driver. The manipulation portion of the master controller is, for example, an emergency button or the like which receives a manipulation of causing the railway vehicle to travel with the power discharged by the battery device 200 in an emergency of the railway vehicle. The emergency of the railway vehicle may include when no AC power is supplied from the power collector 400 to the railway vehicle due to a natural disaster such as an earthquake or a situation such as stoppage of an electrical substation, but the present invention is not limited to this and the emergency may also include a failure of the railway vehicle or the like. Upon receiving an emergency signal, the charging circuit 210 switches the state of each contactor from a power cut-off state to a power supply state.

In a state in which the contactor K1 or K3 and the contactor K2 in the charging circuit 210 are controlled to be in a conductive state, the voltage of the discharge power of the battery device 200 is applied between a positive electrode line and a negative electrode line connected to the input terminals of the DC to AC conversion unit for travel 330. The DC to AC conversion unit for travel 330 converts the discharge power into three-phase AC power for driving the travel motor M by performing a switching operation under the control of the travel power control unit 340.

According to the power conversion system 1 described above, the battery device 200 is connected between the AC to DC conversion unit for loads 110 and both the DC to AC conversion unit for AC loads 120 and the DC to AC conversion unit for DC loads 160 such that, when the power supplied from the windings for loads of the main transformer to the AC to DC conversion unit for loads 110 is reduced, the battery device 200 discharges power corresponding to the power reduction. Thus, the battery device 200 can supply the discharge power to the DC to AC conversion unit for AC loads 120 and the DC to AC conversion unit for DC loads 160. As a result, according to the power conversion system 1, it is possible to suppress a reduction in power supplied to the AC load $L_{DC}$ and the DC load $L_{DC}$ of the railway vehicle.

In addition, according to the power conversion system 1, the AC to DC conversion unit for loads 110 includes a switching circuit including a plurality of switching elements 110a, 110b, 110c, and 110d, such that it is possible to stabilize the DC power output from the AC to DC conversion unit for loads 110. That is, the AC to DC conversion unit for loads 110 enables conversion into DC power with a smaller time variation than a rectifier using diodes. Thus, according to the power conversion system 1, when the DC power supplied from the AC to DC conversion unit for loads 110 to the DC to AC conversion unit for AC loads 120 and the DC to AC conversion unit for DC loads 160 is reduced, it is possible to quickly supply the discharge power from the battery device 200 to the DC to AC conversion unit for AC loads 120 and the DC to AC conversion unit for DC loads 160.

Moreover, according to the power conversion system 1, it is possible to supply the discharge power from the battery device 200 and therefore it is unnecessary to increase the capacitances of the capacitor 122 and the capacitor 162 in consideration of a capacitance for compensating for absence of the supply of power to the AC load $L_{AC}$ and the DC load $L_{DC}$ when the railway vehicle passes through non-electric sections.

In addition, according to the power conversion system 1, DC power which is output from the AC to DC conversion unit for loads 110 is controlled to be stabilized and the output DC power is then supplied to the battery device 200. Therefore, it is possible to charge the battery device 200 without giving a large load to the charging resistance of the battery device 200.

Further, according to the power conversion system 1, it is possible to discharge the battery device 200 in an emergency to supply DC power to the AC to DC conversion unit for travel 320. Thus, according to the power conversion system 1, in an emergency, it is possible to allow travel of the railway vehicle by driving the travel motor M using the discharge power of the battery device 200.

Figure 3:
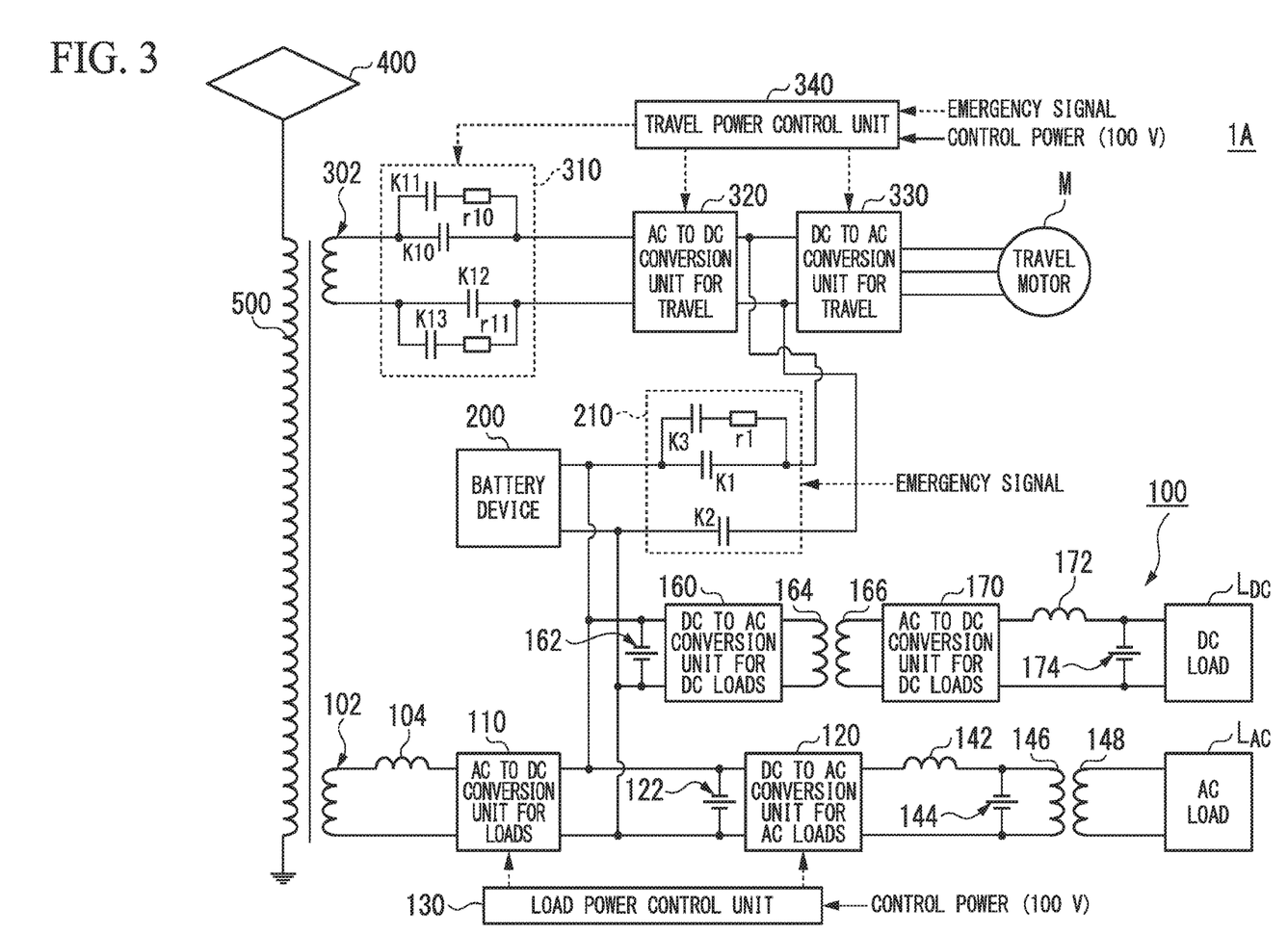
FIG. 3 is a diagram showing an example of a power conversion system 1A according to the first embodiment.

Hereinafter, another example of the power conversion system 1 according to the first embodiment will be described. FIG. 3 is a diagram showing an example of a power conversion system 1A according to the first embodiment. In the power conversion system 1A, a battery device 200 is connected to power lines which connect an AC to DC conversion unit for travel 320 and a DC to AC conversion unit for travel 330. In addition, a charging circuit 210 is provided in the middle of power lines which connect the battery device 200 and the power conversion device for travel 300. In the power conversion system 1A, the battery device 200 supplies discharge power to the DC to AC conversion unit for travel 330 when the charging circuit 210 is switched to a power supply state in an emergency.

According to the power conversion system 1A, it is possible to discharge the battery device 200 in an emergency to supply DC power to the DC to AC conversion unit for travel 330. Thus, according to the power conversion system 1, in an emergency, it is possible to allow the railway vehicle to travel by driving the travel motor M using the discharge power of the battery device 200.

Further, according to the power conversion system 1A, compared to when the discharge power is supplied to the AC to DC conversion unit for travel 320, it is possible to suppress power loss in the AC to DC conversion unit for travel 320 and to use the power of the battery device 200 more efficiently. As a result, according to the power conversion system 1A, it is possible to allow the railway vehicle to travel a longer distance in an emergency.

Figure 4:
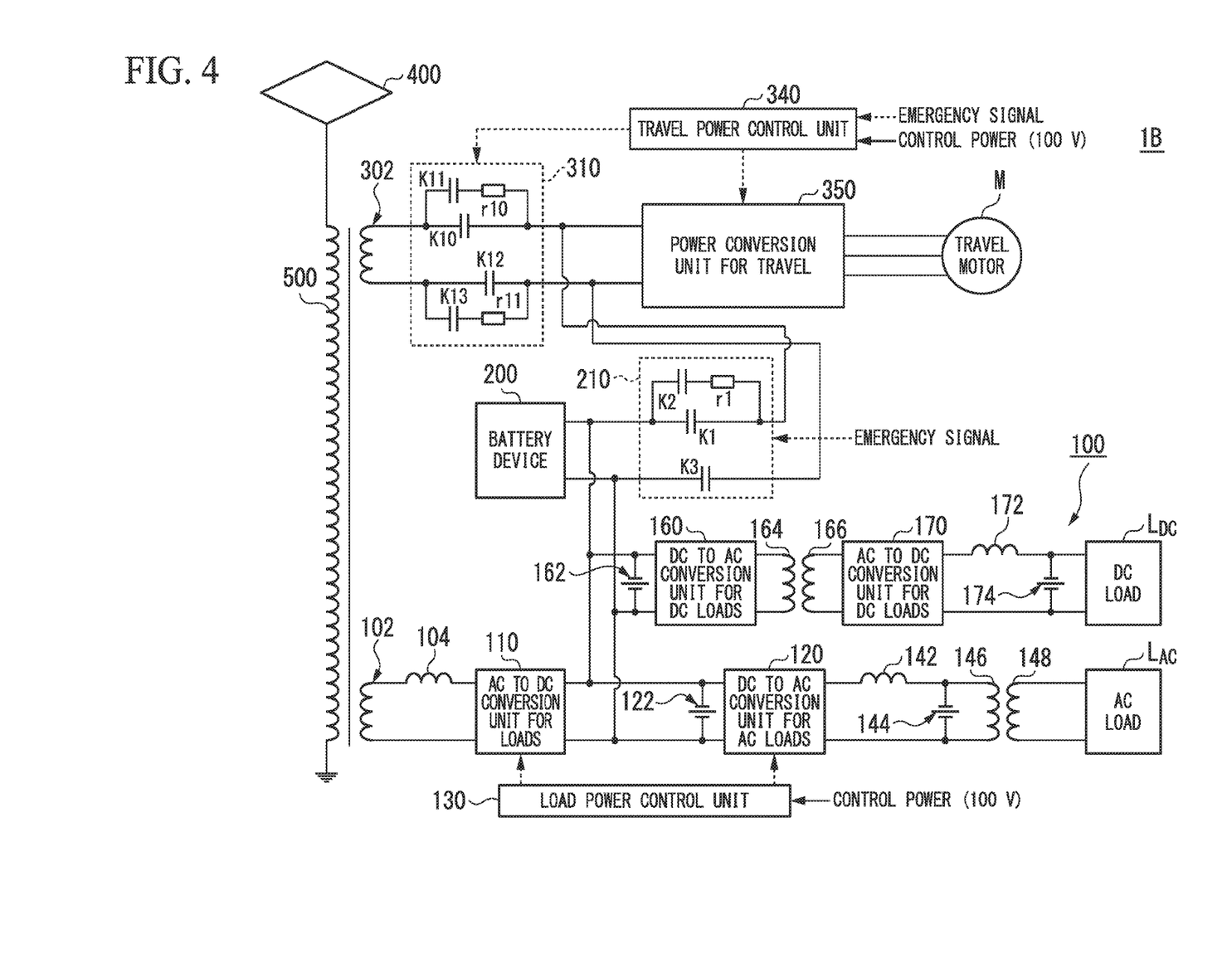
FIG. 4 is a diagram showing an example of a power conversion system 1B according to the first embodiment.

FIG. 4 is a diagram showing an example of a power conversion system 1B according to the first embodiment. The power conversion system 1B includes a power conversion unit for travel 350 into which the AC to DC conversion unit for travel 320 and the DC to AC conversion unit for travel 330 are integrated. The power conversion unit for travel 350 functions to convert high-voltage AC power supplied via the windings for travel of the main transformer into power for travel for driving the travel motor to generate a travel torque allowing travel of the railway vehicle and to supply the power for travel to the travel motor M. The power conversion system 1B connects the battery device 200 to input terminals of the power conversion unit for travel 350 via the charging circuit 210.

According to the power conversion system 1B, even though the power conversion unit for travel 350 is integrally constructed, there is no need to connect the power lines connected between the battery device 200 and the charging circuit 210 to the inside of the power conversion unit for travel 350 and therefore, in an emergency, it is possible to allow travel of the railway vehicle by discharging the battery device 200 without changing the design of the power conversion unit for travel 350.

(Second Embodiment)

A second embodiment will be described hereinafter. A power conversion system 1 according to the second embodiment is different from that of the first embodiment in that the travel mode of the railway vehicle is switched between a first travel mode and a second travel mode. The following description will focus on this difference. The second embodiment will be described with reference to the case in which it is applied to the power conversion system 1 shown in FIG. 1.

The power conversion system 1 allows the railway vehicle to travel in a normal travel mode in a normal situation in which AC power is supplied from the power collector 400. The normal travel mode is an example of the first travel mode. In the normal travel mode, the travel power control unit 340 drives the switching elements in the DC to AC conversion unit for travel 330 on the basis of a carrier signal having a predetermined frequency (also referred to as a carrier frequency) to cause the travel motor M to generate a travel torque.

The power conversion system 1 allows the railway vehicle to travel in an emergency travel mode in an emergency situation in which no AC power is supplied from the power collector 400. The emergency travel mode, which is an example of the second travel mode, is a travel mode in which power is suppressed loss more than in the normal travel mode. In the emergency travel mode, the travel power control unit 340 drives the switching elements in the DC to AC conversion unit for travel 330 on the basis of a carrier signal having a lower frequency than the predetermined frequency (also referred to as a carrier frequency) to cause the travel motor M to generate a travel torque.

Figure 5:
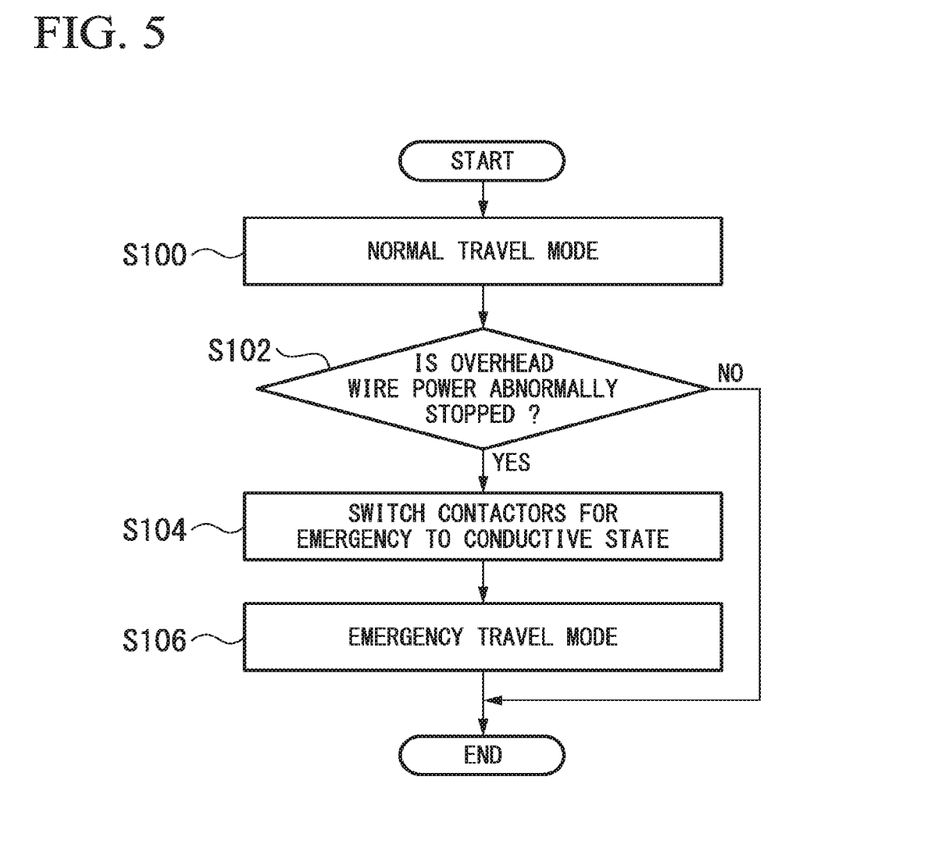
FIG. 5 is a flowchart showing an example of a procedure for switching a travel mode in a second embodiment.
Figure 6:
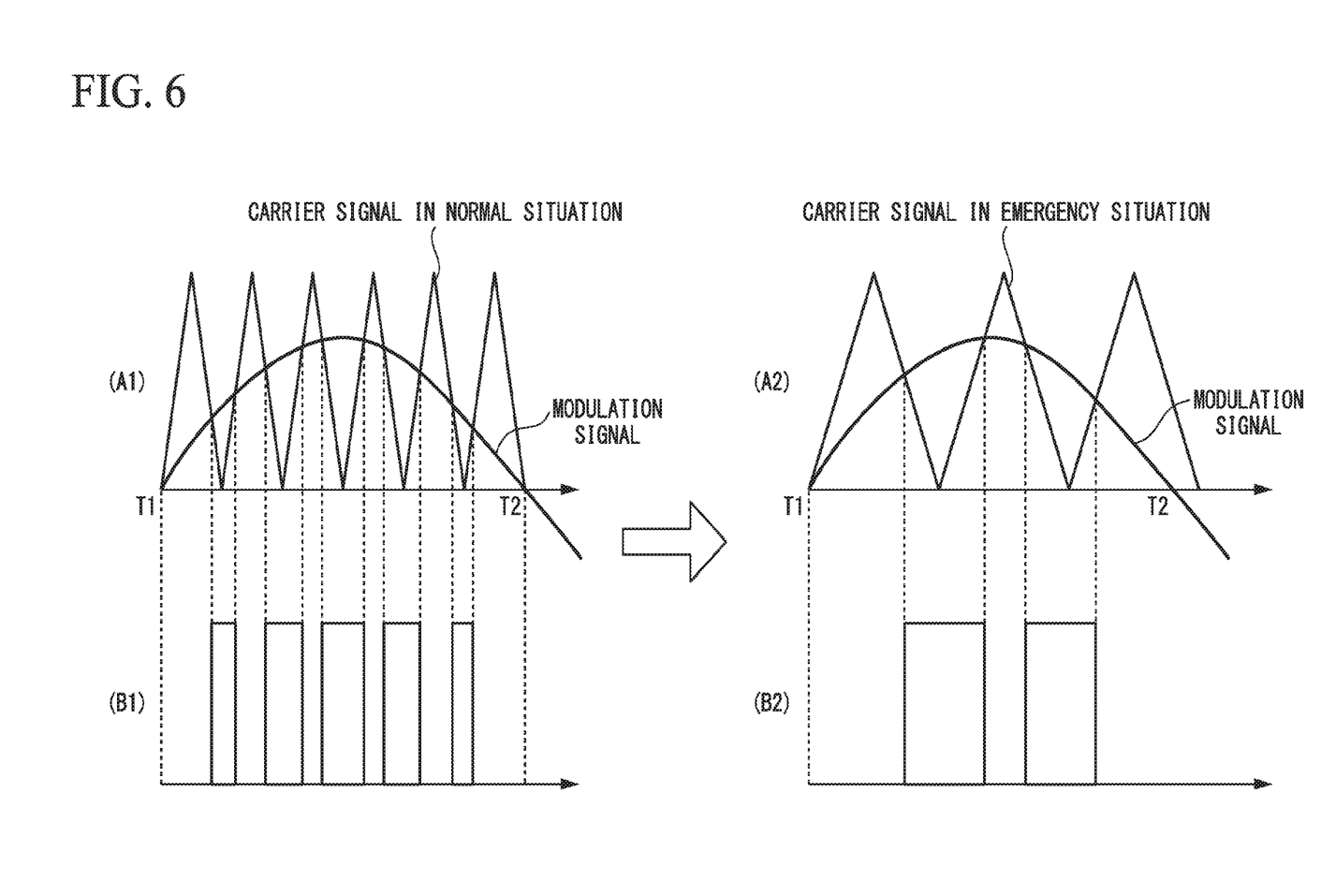
FIG. 6 is a diagram showing examples of carrier signals, modulated waves, and PWM signals in normal and emergency situations.

FIG. 5 is a flowchart showing an example of a procedure for switching the travel mode in the second embodiment. In a normal situation, the travel power control unit 340 allows the railway vehicle to travel in the normal travel mode (step S100). Here, the travel power control unit 340 performs pulse width modulation (PWM) control according to a modulation signal and a carrier signal having a predetermined frequency to control on/off of the switching elements in the DC to AC conversion unit for travel 330. FIG. 6 is a diagram showing examples of carrier signals, modulated waves, and PWM signals in normal and emergency situations. The travel power control unit 340 generates a PWM signal shown in a graph (B1) on the basis of the modulation signal and the carrier signal used in the normal situation having the predetermined frequency shown in a graph (A1). The travel power control unit 340 controls on/off of the switching elements in the DC to AC conversion unit for travel 330 according to the PWM signal to supply AC power for travel to the travel motor M.

The power conversion system 1 then determines whether or not the overhead wire power has abnormally stopped (step S102). When the manipulation portion of the master controller is manipulated, the power conversion system 1 may determine that the overhead wire power has abnormally stopped, but the present invention is not limited to this. The power conversion system 1 may also determine that the overhead wire power is abnormal when a sensor (not shown) provided in the power conversion device for travel 300 or a voltage sensor (not shown) for detecting the voltage applied to the main transformer has detected that the voltage of the overhead wire power has dropped below a specification range.

When the overhead wire power has abnormally stopped, the power conversion system 1 switches the charging circuit 210, which is for use in an emergency, to a conductive state (step S104). This allows the discharge power of the battery device 200 to be supplied to the AC to DC conversion unit for travel 320 via the charging circuit 210.

The travel power control unit 340 allows the railway vehicle to travel in the emergency travel mode (step S106). Here, the travel power control unit 340 performs PWM control according to the modulation signal and the emergency carrier signal having a lower frequency than the carrier signal used in the normal situation to control on/off of the switching elements in the DC to AC conversion unit for travel 330. The travel power control unit 340 generates a PWM signal shown in a graph (B2) on the basis of the emergency carrier signal and the modulation signal shown in a graph (A2). The travel power control unit 340 controls on/off of the switching elements in the DC to AC conversion unit for travel 330 according to the PWM signal to supply AC power for travel to the travel motor M.

In the normal travel mode, the DC to AC conversion unit for travel 330 may be controlled by a PWM signal rising and falling five times from time T1 to T2 as shown in the graphs (A1) and (B1) in FIG. 6. On the other hand, in the emergency travel mode, the DC to AC conversion unit for travel 330 may be controlled by a PWM signal rising and falling twice from time T1 to T2 as shown in the graphs (A2) and (B2) in FIG. 6.

According to the power conversion system 1 according to the second embodiment described above, it is possible to suppress power loss of the DC to AC conversion unit for travel 330 in an emergency situation by driving the travel motor M in an emergency situation on the basis of a carrier signal having a lower frequency than the frequency of a carrier signal in a normal travel mode. As a result, according to the power conversion system 1 according to the second embodiment, it is possible to efficiently use the discharge power of the battery device 200 and therefore it is possible to increase the travel distance of the railway vehicle in an emergency situation.

According to at least one of the embodiments described above, a power conversion device for auxiliary power sources 100 including an AC to DC conversion unit for loads 110, which is configured to convert low-voltage AC power supplied from overhead wires via windings for loads of a main transformer into DC power, a DC to AC conversion unit for AC loads 120, which is configured to perform conversion into AC power for loads for driving an AC load $L_{AC}$, and a DC to AC conversion unit for DC loads 160 and an AC to DC conversion unit for DC loads 170 which are configured to perform conversion into DC power for loads for driving the DC load $L_{DC}$, and a battery device 200, which is connected to power lines connecting DC power output terminals of the AC to DC conversion unit for loads 110 and DC power input terminals of the DC to AC conversion unit for AC loads 120 and the DC to AC conversion unit for DC loads 160 and which is configured to discharge power corresponding to a reduction in power supplied from the windings for loads of the main transformer to the AC to DC conversion unit for loads 110 when the reduction of the power has occurred such that the discharge power is supplied from the battery device 200 to the DC to AC conversion unit for AC loads 120, are provided and therefore it is possible to suppress a reduction in power supplied to loads of the electric vehicle.

While some embodiments of the invention have been described, these embodiments have been set forth as examples without the intention to limit the scope of the invention. These embodiments can be practiced in various other forms, and various omissions, substitutions, and changes can be made without departing from the nature of the invention. The embodiments and modifications thereof are included in the scope and nature of the invention and are also similarly included in the invention described in the claims and equivalent scopes thereof.

What is claimed is:

1. A power conversion system comprising:
   a transformer configured to step down power from an overhead wire;
   a power conversion device for travel connected between a secondary winding of the transformer and a travel motor configured to allow travel of an electric vehicle, the power conversion device for travel being configured to convert first alternating current power supplied via the secondary winding of the transformer into power for travel for driving the travel motor;
   a first alternating current to direct current conversion unit configured to convert second alternating current power supplied via a tertiary winding of the transformer into direct current power,
   a power conversion unit for alternating current loads connected between the first alternating current to direct current conversion unit and an alternating current load which is electrically isolated from the travel motor, the power conversion unit for alternating current loads being configured to convert the direct current power produced through conversion by the first alternating current to direct current conversion unit into alternating current power for driving an alternating current load mounted in the electric vehicle and to supply the alternating current power to the alternating current load,
   a power conversion unit for direct current loads connected between the first alternating current to direct current conversion unit and a direct current load which is electrically isolated from the travel motor, the power conversion unit for direct current loads configured to convert the direct current power produced through conversion by the first alternating current to direct current conversion unit into direct current power for driving a direct current load mounted in the electric vehicle and to supply the direct current power to the direct current load; and
   an electrical storage device connected to a first pair of power lines which connects a direct current power output terminal of the first alternating current to direct current conversion unit and a direct current power input terminal of the power conversion unit for alternating current loads, the electrical storage device being connected to a second paid of power lines which connects the direct current power output terminal of the first alternating current to direct current conversion unit and the power conversion unit for direct current loads;
   a charging circuit for travel connected between the power conversion device for travel and the secondary winding of the transformer; and
   a charging circuit connected to a power line which connects the charging circuit for travel and the power conversion device for travel, the charging circuit being configured to supply a discharge power from the electrical storage device to the power conversion device for travel when there occurs reduction of a power which is supplied to the power conversion device for travel which is configured to supply a power from the secondary winding of the transformer to the travel motor.

2. The power conversion system according to claim 1, wherein the first alternating current to direct current conversion unit includes:
   a switching circuit including a plurality of switching elements and diodes connected in antiparallel with the plurality of switching elements; and
   a control unit configured to switch the plurality of switching elements between a conductive state and a non-conductive state to convert the second alternating current power into direct current power.

3. The power conversion system according to claim 1, wherein the electrical storage device is connected to a power line connecting the power conversion device for travel and the secondary winding of the transformer,
   a contactor configured to be switched between a power cut-off state and a power supply state is provided in a middle of the power line connecting the power conversion device for travel and the secondary winding of the transformer, and
   the electrical storage device is configured to supply discharge power to the power conversion device for travel when the contactor has been switched to the power supply state.

4. The power conversion system according to claim 3, further comprising a manipulation portion configured to receive a manipulation of causing the electric vehicle to travel with power discharged by the electrical storage device when the electric vehicle is in an emergency, wherein the contactor is configured to be switched from the power cut-off state to the power supply state upon receiving the manipulation by the manipulation portion.

5. The power conversion system according to claim 4, further comprising a travel power control unit configured to switch a travel mode between a first travel mode in which the travel power control unit drives switching elements in the power conversion device for travel on the basis of a carrier signal having a predetermined frequency to cause the travel motor to generate a travel torque in a normal situation in which the electric vehicle is not in an emergency, and a second travel mode in which the travel power control unit drives the switching elements on the basis of a carrier signal having a lower frequency than the predetermined frequency to cause the travel motor to generate a travel torque, wherein the travel power control unit is configured to switch the travel mode to the second travel mode when the electric vehicle is in an emergency.

6. The power conversion system according to claim 1, wherein the power conversion device for travel includes a second alternating current to direct current conversion unit configured to convert the first alternating current power into direct current power and a direct current to alternating current conversion unit configured to convert the direct current power produced through conversion by the second alternating current to direct current conversion unit into the power for travel, the electrical storage device is connected to a power line connecting the second alternating current to direct current conversion unit and the direct current to alternating current conversion unit, a contactor configured to be switched between a power cut-off state and a power supply state is provided in a middle of the power line connecting the second alternating current to direct current conversion unit and the direct current to alternating current conversion unit, and the electrical storage device is configured to supply discharge power to the direct current to alternating current conversion unit when the contactor has been switched to the power supply state.

* * * * *